United States Patent
Fujishima (10) Patent No.: US 7,734,156 B2
(45) Date of Patent: Jun. 8, 2010

(54) DISC REPRODUCTION APPARATUS CAPABLE OF DIGEST REPRODUCTION

(75) Inventor: Yoshikazu Fujishima, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1267 days.

(21) Appl. No.: 11/157,576

(22) Filed: Jun. 21, 2005

(65) Prior Publication Data

US 2005/0286362 A1    Dec. 29, 2005

(30) Foreign Application Priority Data

Jun. 25, 2004    (JP) ............................. 2004-188255

(51) Int. Cl.
*H04N 5/00*    (2006.01)
(52) U.S. Cl. .................. 386/125; 386/124; 386/126; 386/111; 386/112; 386/101; 386/95
(58) Field of Classification Search ............ 386/95, 386/111–112, 124–126, 101
See application file for complete search history.

(56) References Cited

U.S. PATENT DOCUMENTS

| 5,974,218 | A * | 10/1999 | Nagasaka et al. ............. 386/46 |
| 7,145,684 | B2 | 12/2006 | Tojo |
| 2002/0122212 | A1 | 9/2002 | Tojo |
| 2003/0099460 | A1* | 5/2003 | Imada et al. .................. 386/52 |
| 2005/0177858 | A1* | 8/2005 | Ueda .......................... 725/105 |
| 2006/0132853 | A1 | 6/2006 | Tojo |
| 2006/0140067 | A1* | 6/2006 | Kizuki et al. ............. 369/30.01 |
| 2006/0188223 | A1* | 8/2006 | Ikeda et al. .................... 386/95 |
| 2007/0003212 | A1* | 1/2007 | Shiiyama .................... 386/46 |

FOREIGN PATENT DOCUMENTS

| JP | 11-288580 | 10/1999 |
| JP | 2000-253351 | 9/2000 |
| JP | 2001-076474 | 3/2001 |
| JP | 2002-074912 | 3/2002 |

(Continued)

OTHER PUBLICATIONS

Patent Abstracts of Japan, Publication No. 2001-076474, Publication Date: Mar. 23, 2001, 1 page.

(Continued)

*Primary Examiner*—Thai Tran
*Assistant Examiner*—Helen Shibru
(74) *Attorney, Agent, or Firm*—Osha • Liang LLP (57) ABSTRACT

A disc reproduction apparatus reading and reproducing data containing a plurality of chapters recorded on a disc-like recording medium includes an input unit for accepting an input of an instruction from a user and a control unit for controlling a reproduction operation in accordance with the instruction accepted through the input unit. The control unit reads information on the plurality of chapters recorded on the recording medium when information designating a first reproduction time period is accepted through the input unit. In addition, second reproduction time periods respectively corresponding to chapters are calculated based on the information on the plurality of chapters that has been read and the designated first reproduction time period. Then, digest reproduction is performed by reading at least part of the chapter recorded on the recording medium in accordance with the calculated second reproduction time periods.

10 Claims, 10 Drawing Sheets

FOREIGN PATENT DOCUMENTS

| | | |
|---|---|---|
| JP | 2002-100109 | 4/2002 |
| JP | 2002-230950 | 8/2002 |
| JP | 2002-262228 | 9/2002 |
| JP | 2002-262230 | 9/2002 |
| JP | 2002-281449 | 9/2002 |
| JP | 2003-37802 | 2/2003 |
| JP | 2003-091975 | 3/2003 |

OTHER PUBLICATIONS

Patent Abstracts of Japan, Publication No. 2002-074912, Publication Date: Mar. 15, 2002, 1 page.
Patent Abstracts of Japan, Publication No. 2002-100109, Publication Date: Apr. 5, 2002, 1 page.
Patent Abstracts of Japan, Publication No. 2002-230950, Publication Date: Aug. 16, 2002, 1 page.
Patent Abstracts of Japan, Publication No. 2003-091975, Publication Date: Mar. 28, 2003, 1 page.
Japanese Office Action for Japanese Application No. 2004-188255, mailed on Sep. 16, 2008 (6 pages).
Patent Abstracts of Japan for Japanese Publication No. 11-288580, Publication date Oct. 19, 1999 (1 page).
Patent Abstracts of Japan for Japanese Publication No. 2002-281449, Publication date Sep. 27, 2002 (1 page).
Patent Abstracts of Japan for Japanese Publication No. 2003-037802, Publication date Feb. 7, 2003 (1 page).
Japanese Office Action for Japanese patent application No. 2004-188255, mailed Jun. 30, 2009, 3 pages.
Patent Abstracts of Japan for Japanese patent application with Publication No. 2002-262228, Date of Publication: Sep. 13, 2002, 1 page.
Mechanical English translation from www4.ipdl.inpit.go.jp for Japanese patent application with Publication No. 2002-262228, Publication Date: Sep. 13, 2002, 24 pages.
English Abstract from espacenet.com for Japanese patent application with Publication No. 2002-262230, Publication Date: Sep. 13, 2002, 1 page.
Patent Abstracts of Japan for Japanese patent application with Publication No.: 2000-253351, Publication Date: Sep. 14, 2000, 1 page.
Mechanical English translation from www4.ipdl.inpit.go.jp for Japanese patent application with Publication No. 2000-253351, Publication Date: Sep. 14, 2000, 41 pages.

\* cited by examiner

| CHAPTER | DURATION | REPRODUCTION TIME PERIOD |
|---------|----------|--------------------------|
| A | 10 MINUTES | 2 MINUTES 00 SECOND |
| B | 4 MINUTES | 0 MINUTE 48 SECONDS |
| C | 16 MINUTES | 3 MINUTES 12 SECONDS |
| D | 5 MINUTES | 1 MINUTE 00 SECOND |
| E | 15 MINUTES | 3 MINUTES 00 SECOND |

| | 71 | 72 | 73 | 74 |
|---|---|---|---|---|
| | CHAPTER | DURATION | REPRODUCTION TIME PERIOD | REPRODUCTION START POSITION |
| | A | 10 MINUTES | 2 MINUTES | 3 MINUTES 30 SECONDS |
| | B | 4 MINUTES | 2 MINUTES | 1 MINUTE 45 SECONDS |
| | C | 16 MINUTES | 2 MINUTES | 1 MINUTE 15 SECONDS |
| | D | 5 MINUTES | 2 MINUTES | 1 MINUTE 30 SECONDS |
| | E | 15 MINUTES | 2 MINUTES | 12 MINUTES 15 SECONDS |

DISC REPRODUCTION APPARATUS CAPABLE OF DIGEST REPRODUCTION

BACKGROUND OF THE INVENTION

1. Field of the Invention

The present invention relates to a disc reproduction apparatus, and more particularly to a disc reproduction apparatus performing digest reproduction.

2. Description of the Background Art

Chapters are contained in data recorded on a disc such as a DVD (Digital Versatile Disc). A technique to designate a reproduction time period by utilizing such chapters is available.

For example, Japanese Patent Laying Open No. 2001-76474 discloses a medium reproduction apparatus reproducing a medium in accordance with a reproduction time period set for each chapter. In addition, Japanese Patent Laying Open No. 2002-74912 discloses a program reproduction apparatus reproducing a chapter or a title and a section thereof bearing a designated number for a designated period of time, after a user sequentially designates the chapter or the title and the section thereof by the number provided thereto. In connection with such chapters, Japanese Patent Laying Open No. 2002-100109 discloses an information reproduction apparatus automatically stopping a reproduction operation when a number actually provided to a chapter or a title matches with a designated number thereof at the time of reproduction.

In addition, a technique to designate a reproduction time period without utilizing chapters or the like is also available.

For example, Japanese Patent Laying Open No. 2002-230950 discloses an optical disc recording and reproduction apparatus, in which a time period to be skipped, that is, a prescribed time period out of a reproduction time period of a video and audio signal recorded on an optical disc and a reproduction time period for reproducing the video and audio signal for a prescribed time period are set, and reproduction is performed in such a manner as alternately repeating skipping and reproduction. In addition, Japanese Patent Laying Open No. 2003-91975 discloses an information reproduction apparatus scanning and reproducing data for reproduction for each unit period, based on a designated unit period and a reproduction time period lasting for that unit period.

According to Japanese Patent Laying Open Nos. 2001-76474 and 2002-74912, however, the reproduction time period should be set for each chapter, which results in a troublesome operation. In addition, according to Japanese Patent Laying Open Nos. 2002-230950 and 2003-91975, it is difficult to grasp a total reproduction time period because the reproduction time period within a certain period is merely set.

SUMMARY OF THE INVENTION

The present invention was made to solve the above-described problems, and an object of the present invention is to provide a disc reproduction apparatus capable of automatic digest reproduction by designating a total reproduction time period.

A disc reproduction apparatus according to one aspect of the present invention includes: a reproduction unit for reading and reproducing data containing a plurality of chapters recorded on a disc-like recording medium; an input unit for accepting an input of an instruction from a user; and a control unit for controlling a reproduction operation by the reproduction unit in accordance with the instruction accepted through the input unit. The control unit includes a read portion for reading information on the plurality of chapters recorded on the recording medium when information designating a first reproduction time period is accepted through the input unit, a time calculation portion for calculating second reproduction time periods respectively corresponding to the chapters, based on information on the plurality of chapters read by the read portion and the designated first reproduction time period, and a chapter control portion for reading and reproducing at least part of the chapter recorded on the recording medium, in accordance with the second reproduction time periods calculated by the time calculation portion.

Preferably, the time calculation portion calculates the second reproduction time periods by dividing the first reproduction time period by the number of the chapters read by the read portion.

More preferably, the time calculation portion calculates the second reproduction time periods by proportionally allocating the first reproduction time period based on a duration of each chapter.

Preferably, the chapter control portion reads and reproduces at least part of each chapter from chapter beginning point.

Preferably, the control unit described above further includes a determination portion for randomly determining a reproduction start position of each chapter, and the chapter control portion reads and reproduces at least part of each chapter from the reproduction start position determined by the determination portion.

Preferably, the determination portion determines the reproduction start position of each chapter by using a random number table stored in advance.

Preferably, the disc reproduction apparatus further includes a selection unit for allowing a user to choose whether the reproduction start position of each chapter should be the beginning of each chapter or a random position in each chapter; and a storage unit for storing the reproduction start position of each chapter in accordance with a result of choice through the selection unit. The chapter control portion reads and reproduces at least part of each chapter from the reproduction start position stored in the storage unit.

Preferably, the control unit further includes a determination portion for randomly determining the reproduction start position of each chapter when choice indicating reproduction from a random position is made through the selection unit, and the storage unit stores, for each chapter, the reproduction start position determined by the determination portion.

Preferably, when choice indicating reproduction from the beginning of each chapter is made through the selection unit, the storage unit stores the beginning of each chapter.

A disc reproduction apparatus according to another aspect of the present invention includes: a reproduction unit for reading and reproducing data containing a plurality of chapters recorded on a disc-like recording medium; an input unit for accepting an input of an instruction from a user; and a control unit for controlling a reproduction operation by the reproduction unit in accordance with the instruction accepted through the input unit. The control unit includes a read portion for reading information on the plurality of chapters recorded on the recording medium when information designating a first reproduction time period is accepted through the input unit, a time calculation portion for calculating second reproduction time periods respectively corresponding to the chapters, based on information on the plurality of chapters read by the read portion and the designated first reproduction time period, a determination portion for randomly determining a reproduction start position of each chapter, and a chapter control portion for reading and reproducing at least part of the chapter recorded on the recording medium in accordance with the second reproduction time periods calculated by the time calculation portion. The time calculation portion has a first calculation portion for calculating the second reproduction time periods by dividing the first reproduction time period by the number of chapters read by the read portion, and a second calculation portion for calculating the second reproduction time periods by proportionally allocating the first reproduction time period based on a duration of each chapter. The chapter control portion has a first start portion reading and reproducing at least part of the chapter from chapter beginning point, and a second start portion reading and reproducing at least part of the chapter from the reproduction start position determined by the determination portion.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described hereinafter in detail with reference to the drawings. The same or corresponding elements have the same reference characters allotted, and detailed description thereof will not be repeated.

First Embodiment

Initially, a disc reproduction apparatus according to a first embodiment of the present invention will be described. In the first embodiment, a DVD recorder representing one manner of the disc reproduction apparatus is employed.

Figure 1:
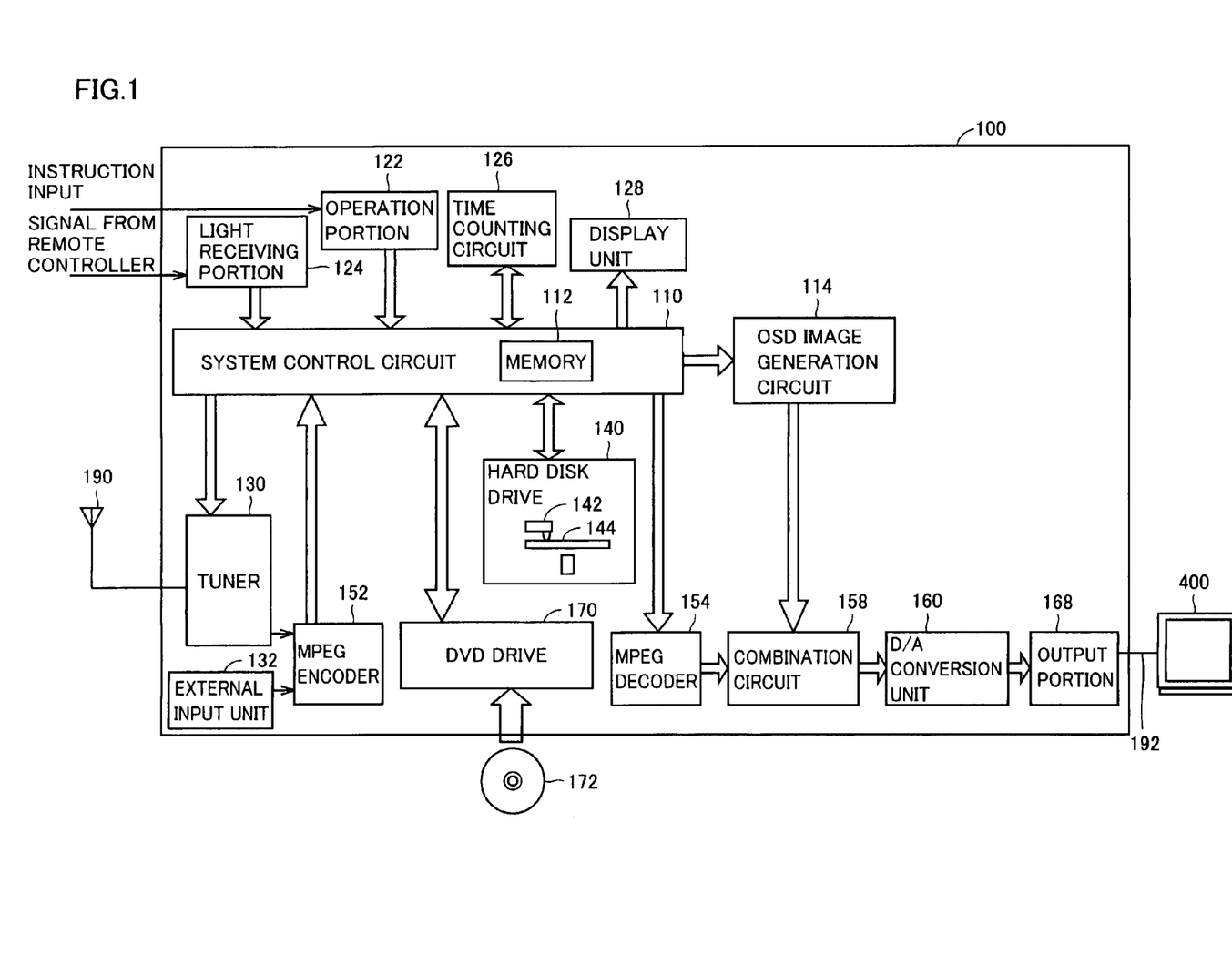
FIG. 1 is a block diagram showing a hardware configuration of a DVD recorder according to a first embodiment of the present invention.

FIG. 1 is a block diagram showing a hardware configuration of a DVD recorder 100.

DVD recorder 100 includes a memory 112 for storing data, a system control circuit 110 for performing processing predetermined based on stored data and an externally input instruction, an operation portion 122 for accepting an external input of an instruction from a user, a light-receiving portion 124 for receiving a signal from a remote controller and outputting a predetermined control signal to system control circuit 110, a time counting circuit 126 for counting time and outputting a signal to system control circuit 110, and a display unit 128 for displaying information indicating an operation state of DVD recorder 100. Here, the operation state refers, for example, to time information in the DVD recorder, a state of reception by a tuner, a recording state of a program, or the like.

Referring again to FIG. 1, DVD recorder 100 further includes an antenna 190, a tuner 130 for selecting a predetermined radio wave from received radio waves, an external input unit 132 for accepting an external input of a video and audio signal, an MPEG (Moving Picture Experts Group) encoder 152 for compressing the input signal based on predetermined processing, a hard disk drive 140 for storing digital data based on the instruction from system control circuit 110, a DVD drive 170 for driving a DVD 172 so as to record or reproduce video and audio data, an MPEG decoder 154 for decoding the compressed video and audio signal, an OSD (On Screen Display) image generation circuit 114 for generating a signal for displaying the operation state or other information of DVD recorder 100 on a video display screen, a combination circuit 158 for combining a signal generated by OSD image generation circuit 114 with a signal output from MPEG decoder 154 and outputting the combined signal, a D/A (Digital to Analog) conversion unit 160 for converting an input digital signal to an analog signal and outputting the resultant signal, and an output portion 168 for outputting the video and audio signal, to which a transmission cable 192 can be connected. DVD recorder 100 is connected to a television 400 through transmission cable 192.

Figure 2:
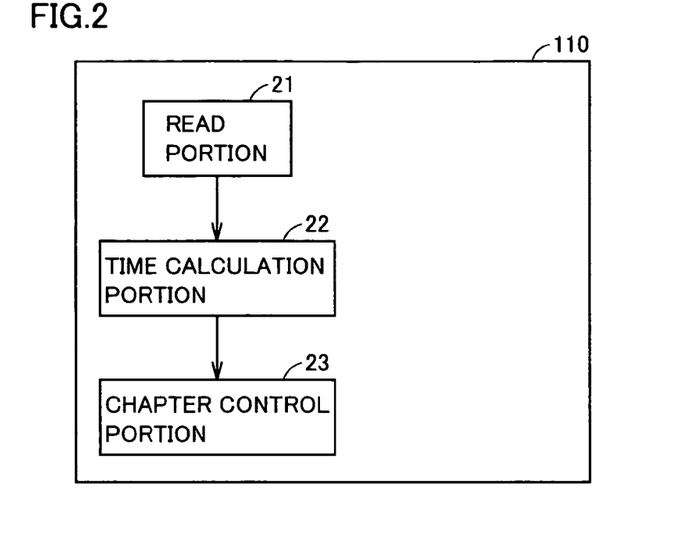
FIG. 2 is a functional block diagram of a system control circuit according to the first embodiment of the present invention.

FIG. 2 shows a functional block diagram of system control circuit 110 according to the first embodiment of the present invention. Referring to FIG. 2, system control circuit 110 includes a read portion 21 for reading chapter information recorded in advance on a disc-like recording medium such as DVD 172, a calculation portion 22 for calculating reproduction time periods respectively corresponding to chapters based on the chapter information read by read portion 21 and the reproduction time period designated by the user, and a chapter control portion 23 for reproducing at least part of video data in each chapter recorded on DVD 172 in accordance with the reproduction time period for each chapter calculated by calculation portion 22. An operation in each functional block may be performed by executing software stored in memory 112, or at least one of the operations may be performed by hardware.

In the present embodiment, description will be given by adopting DVD 172 as an example of a disc-like recording medium, however, the recording medium is not limited thereto. For example, a hard disk 144 or the like may be employed.

Processing for digest reproduction in the disc reproduction apparatus according to the first embodiment will now be described with reference to a flowchart shown in FIG. 3.

Figure 3:
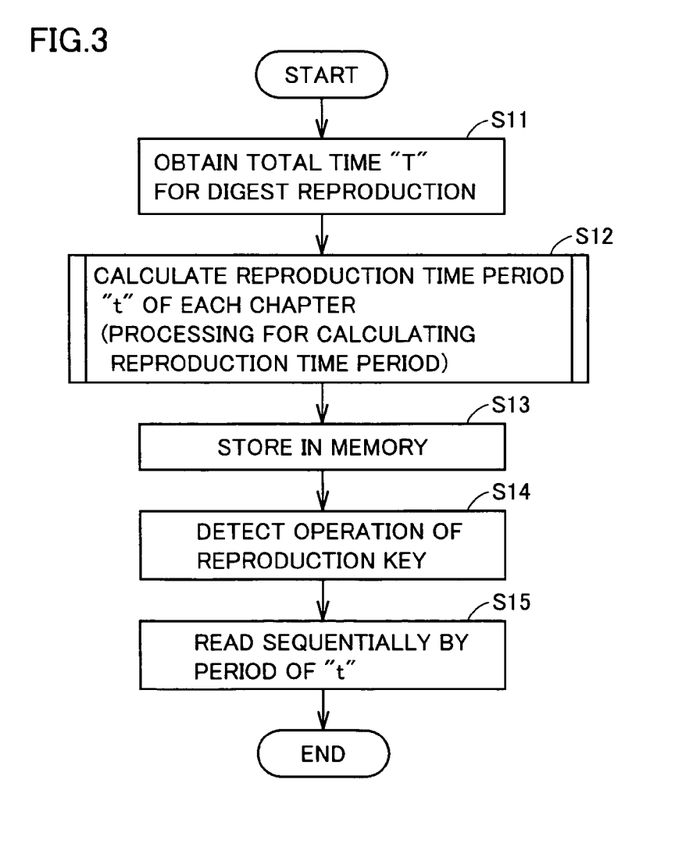
FIG. 3 is a flowchart showing processing for digest reproduction according to the first embodiment of the present invention.

The processing for digest reproduction shown in FIG. 3 is started when system control circuit 110 detects selection of digest reproduction based on a signal input from operation portion 122 or light-receiving portion 124. When the processing for digest reproduction is started, the chapter information recorded on DVD 172 is read from DVD 172 mounted on DVD drive 170, and the read information is stored in memory 112.

Referring to FIG. 3, initially, system control circuit 110 obtains a total time "T" for digest reproduction, based on the signal input from operation portion 122 or light-receiving portion 124 (step S11). Then, system control circuit 110 calculates a reproduction time period "t" for each chapter (step S12).

Figure 4:
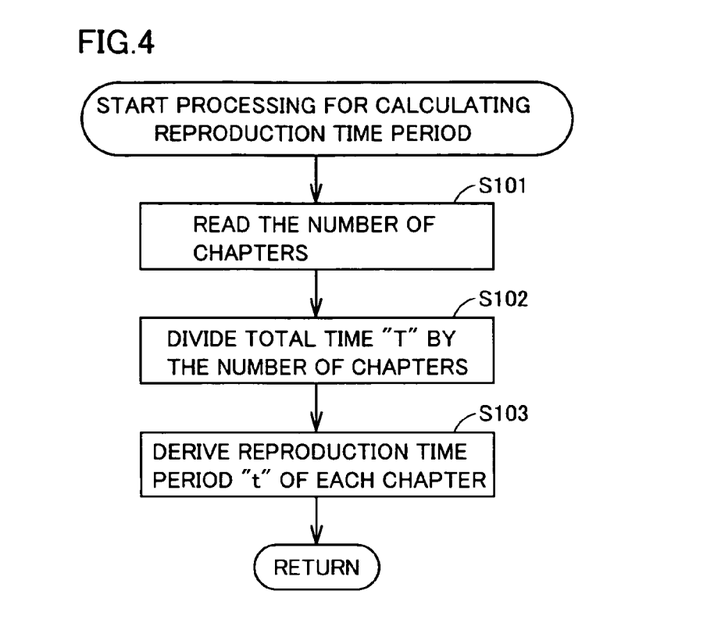
FIG. 4 is a flowchart showing processing for calculating a reproduction time period according to the first embodiment of the present invention.

Here, processing for calculating the reproduction time period at step S12 described above in the first embodiment will be described in further detail with reference to a flowchart in FIG. 4. Referring to FIG. 4, initially, system control circuit 110 reads the number of chapters contained in video data recorded on DVD 172 from the chapter information stored in memory 112 (step S101). Then, system control circuit 110 derives reproduction time period "t" for each chapter (step S103) by dividing total time "T" by the number of chapters that has been read (step S102).

Referring again to FIG. 3, reproduction time period "t" for each chapter calculated at step S12 is stored in memory 112 (step S13).

In succession, system control circuit 110 detects whether or not a reproduction key has been operated, based on the signal input from operation portion 122 or light-receiving portion 124 (step S14). When the operation of the reproduction key is detected at step S14, reproduction time period "t" for each chapter is read from memory 112. Then, video data from the beginning of each chapter is sequentially read by a period of "t" from DVD 172 mounted on DVD drive 170, and a video image is output to television 400 (step S15).

Figure 5:
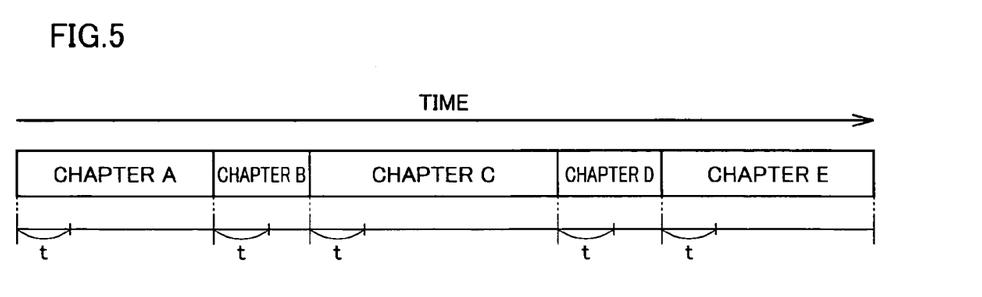
FIG. 5 is a timing chart in digest reproduction according to the first embodiment of the present invention.

FIG. 5 shows a timing chart in digest reproduction according to the first embodiment. Referring to FIG. 5, it is assumed that video data recorded on DVD 172 includes chapters A to E. After reading video data by a period of "t" from the beginning of chapter A, reading proceeds to next chapter B. Similarly, reading is completed by reading video data by a period of "t" from respective beginning of chapters B to E.

In this manner, as the reproduction time period designated by the user is divided by the number of chapters, the video data in each chapter can evenly be viewed. In addition, inconvenience in the operation can be eliminated because it is not necessary to input a reproduction time period for each chapter. Moreover, as reproduction is controlled based on the reproduction time period designated by the user, digest of the DVD can readily be viewed at the user's convenience. Therefore, the user can view the digest of the DVD at his/her leisure.

If duration of one chapter is shorter than "t", all data in that chapter is naturally read and reading proceeds to the next chapter.

The processing at step S14 may not be performed. In such a case, once system control circuit 10 obtains total time "T" for digest reproduction at step S11, it continues the processing as far as the reproduction.

Variation of First Embodiment

A configuration of the disc reproduction apparatus and a function thereof in a variation of the first embodiment of the present invention are similar to those in the first embodiment described above.

The variation of the first embodiment is different from the first embodiment in a method of calculating reproduction time period "t" for each chapter in the processing for digest reproduction set forth in the first embodiment (see step S112 in the flowchart in FIG. 3).

In the variation of the first embodiment, in order to calculate reproduction time period "t" for each chapter at step S12, a storage area is prepared in memory 112 for each chapter recorded in advance on DVD 172.

Figure 6:
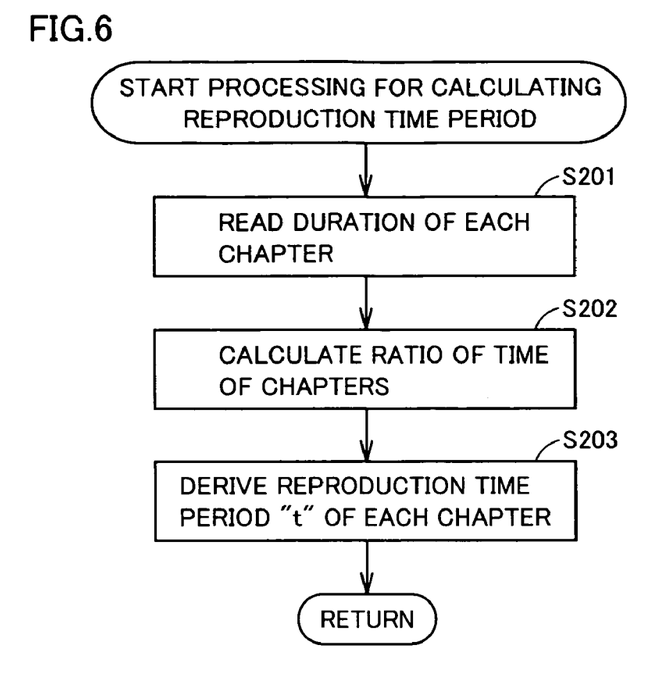
FIG. 6 is a flowchart showing processing for calculating a reproduction time period according to the first embodiment of the present invention.

The processing for digest reproduction according to the variation of the first embodiment will now be described with reference to FIGS. 3 and 6. FIG. 6 is a flowchart for illustrating in further detail the processing for calculating a reproduction time period at step S12 according to the variation of the first embodiment.

Referring to FIG. 3, when total time "T" for digest reproduction is obtained at step S11, reproduction time period "t" for each chapter is calculated (step S12).

More specifically, referring to FIG. 6, system control circuit 110 reads duration of each chapter (step S201). Based on the read duration, a ratio of time of each chapter is calculated (step S202). That is, a ratio of duration of each chapter to the total duration of all chapters, i.e., a total duration, is calculated. Then, reproduction time period "t" for each chapter in accordance with the ratio of time is derived (step S203).

Referring again to FIG. 3, reproduction time period "t" for each chapter calculated at step S12 is stored in the storage area within memory 112 (step S13).

Here, the storage area prepared within memory 112 will be described with reference to FIG. 7.

Figure 7:
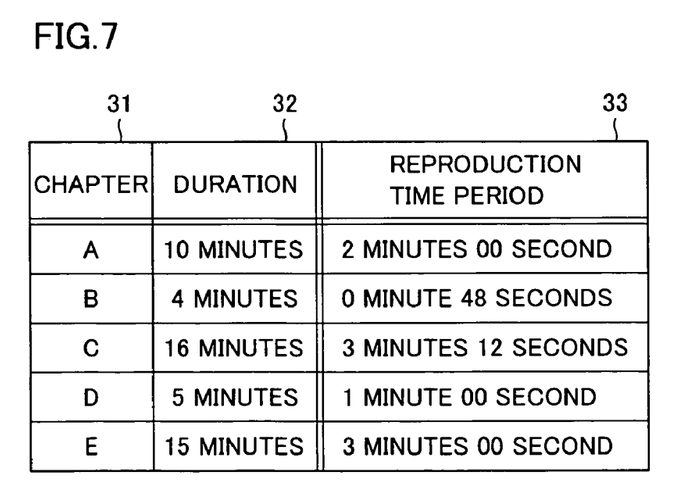
FIG. 7 illustrates a memory area according to a variation of the first embodiment of the present invention.

Referring to FIG. 7, an area 31 sequentially stores information for specifying chapters. An area 32 stores an actual duration of each chapter. An area 33 stores reproduction time period "t" calculated at step S12.

For example, referring to area 31, it is assumed that chapters A to E are contained in video data recorded on DVD 172. Then, referring to area 32, the duration of chapters A to E are assumed as 10 minutes, 4 minutes, 16 minutes, 5 minutes, and 15 minutes, respectively. That is, the total duration of video data recorded on DVD 172 sums up to 50 minutes.

Here, total reproduction time period "T" obtained at step S11 described above is assumed, for example, as 10 minutes. Then, reproduction time period "t" calculated by system control circuit 110 at step S12, denoted by "ta" to "te" respectively, is as follows: ta=10×10/50, i.e., 2 minutes; tb=10×4/50, i.e., 48 seconds; tc=10×16/50, i.e., 3 minutes and 12 seconds; td=10×5/50, i.e., 1 minute; and te=10×15/50, i.e., 3 minutes.

Referring again to FIG. 3, system control circuit 110 stores reproduction time period "t" ("ta" to "te") thus calculated in area 33 (step S13).

In succession, when the operation of the reproduction key is detected at step S14, system control circuit 110 reads reproduction time period "t" ("ta" to "te") for each chapter from memory 112. Then, video data from the beginning of each chapter by a period of "ta" to "te" is sequentially read from DVD 172 mounted on DVD drive 170, and the video image is output to television 400 (step S15).

Figure 8:
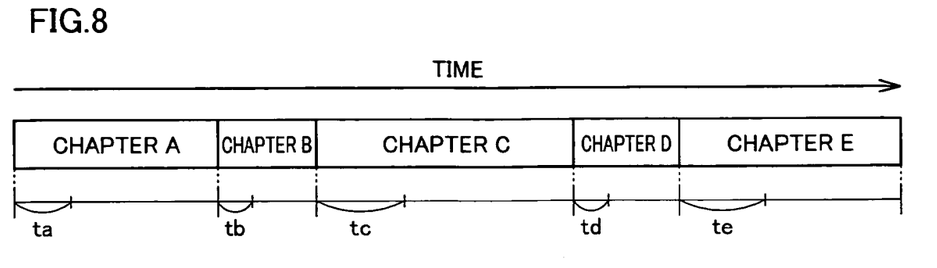
FIG. 8 is a timing chart in digest reproduction according to the variation of the first embodiment.

FIG. 8 shows a timing chart in digest reproduction according to the variation of the first embodiment.

Referring to FIG. 8, if video data recorded on DVD 172 includes chapters A to E, data from the beginning of chapter A by a period of "ta" (2 minutes, for example) is read, and reading proceeds to next chapter B. Similarly, reading is completed by reading data of chapter B by a period of "tb" (48 seconds, for example), data of chapter C by a period of "tc" (3 minutes and 12 seconds, for example), data of chapter D by a period of "td" (1 minute, for example), and data of chapter E by a period of "te" (3 minutes, for example).

As described above, reproduction is carried out such that the reproduction time period designated by the user is divided based on a ratio of duration of each chapter. Therefore, the video data of each chapter can be viewed in accordance with the duration of the chapters. If the duration of a certain chapter is long, the video data in that chapter is reproduced for a relatively long time. Accordingly, the contents in the DVD can be grasped more sufficiently even with digest reproduction.

Second Embodiment

A second embodiment of the disc reproduction apparatus according to the present invention will now be described.

A configuration of the disc reproduction apparatus and a function thereof in the second embodiment are similar to those in the first embodiment described above. The second embodiment is different from the first embodiment in a reproduction start position for each chapter at the time of digest reproduction.

Figure 9:
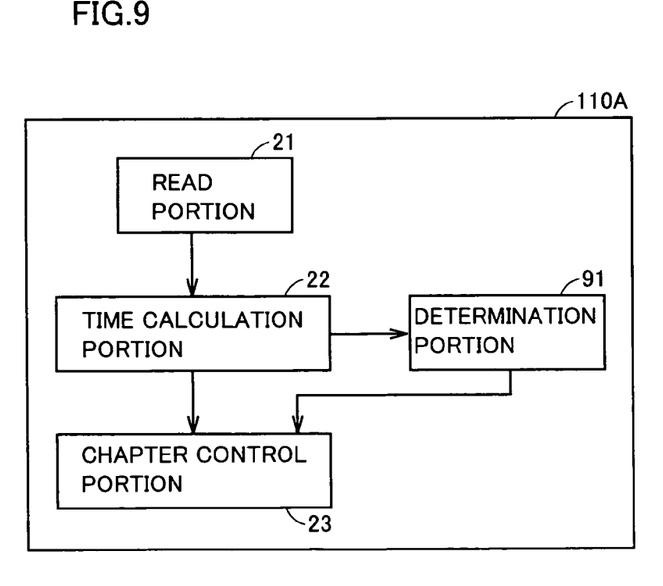
FIG. 9 is a functional block diagram of a system control circuit according to a second embodiment of the present invention.

FIG. 9 is a functional block diagram of a system control circuit 110A according to the second embodiment of the present invention. Referring to FIG. 9, system control circuit 110A includes read portion 21, time calculation portion 22, and chapter control portion 23 as in the first embodiment and its variation, as well as a determination portion 91 for randomly determining a reproduction start position for each chapter.

Figure 10:
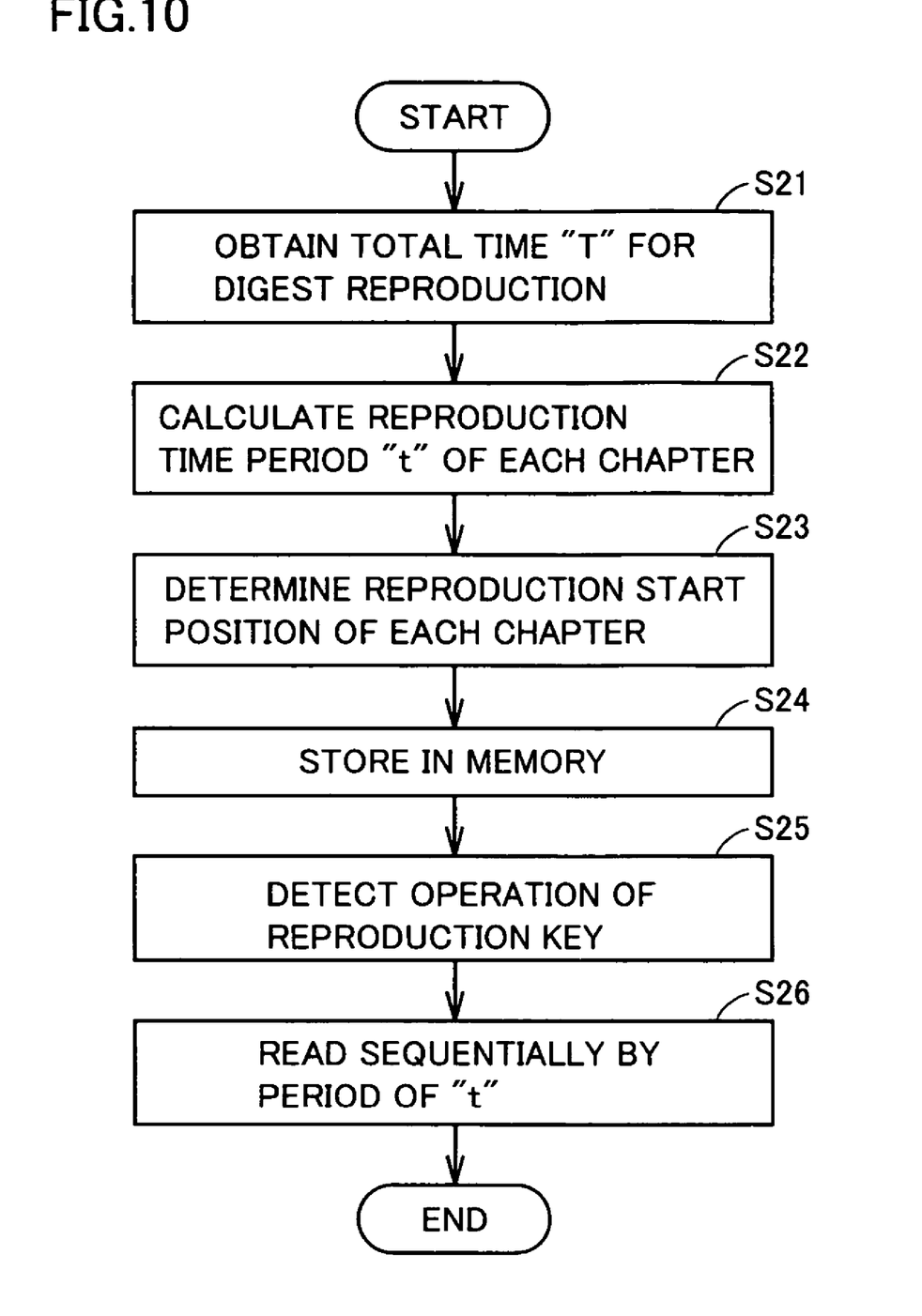
FIG. 10 is a flowchart showing processing for digest reproduction according to the second embodiment of the present invention.

FIG. 10 is a flowchart showing processing for digest reproduction according to the second embodiment.

The processing for digest reproduction shown in FIG. 10 is started when system control circuit 110A detects selection of digest reproduction based on the signal input from operation portion 122 or light-receiving portion 124. When the processing for digest reproduction is started, the chapter information recorded on DVD 172 is read from DVD 172 mounted on DVD drive 170, and the read information is stored in memory 112.

Referring to FIG. 10, initially, system control circuit 110A obtains total time "T" for digest reproduction, based on the signal input from operation portion 122 or light-receiving portion 124 (step S21). Then, system control circuit 110A reads the number of chapters contained in video data recorded on DVD 172 from the chapter information stored in memory 112. Then, system control circuit 110A calculates reproduction time period "t" for each chapter by dividing total time "T" by the number of chapters (step S22).

Here, the reproduction start position of each chapter is randomly determined (step S23). For example, duration of a certain chapter is assumed as "T1", and reproduction time period of each chapter calculated at step S22 is assumed as "t". Then, the reproduction start position of that chapter is randomly determined in a range of "T1"-"t". Specifically, the duration of a certain chapter is assumed as 5 minutes and reproduction time period "t" for each chapter calculated at step S22 is assumed as 2 minutes. Then, the reproduction start position of that chapter is randomly determined in a range from 0 to 3 minutes. In a method of randomly determining a reproduction start position of each chapter, for example, a random number table stored in advance in memory 112 is used.

In this manner, reproduction-time period "t" for each chapter calculated at steps S22 and S23 and the reproduction start position of each chapter are stored in storage areas within memory 112 (step S24).

In succession, system control circuit 110A detects whether or not the reproduction key has been operated, based on the signal input from operation portion 122 or light-receiving portion 124 (step S25). When the operation of the reproduction key is detected at step S25, reproduction time period "t" and the reproduction start position for each chapter are read from memory 112. Then, video data from the determined reproduction start position of each chapter is sequentially read by a period of "t" from DVD 172 mounted on DVD drive 170, and the video image is output to television 400 (step S26).

Figure 11:
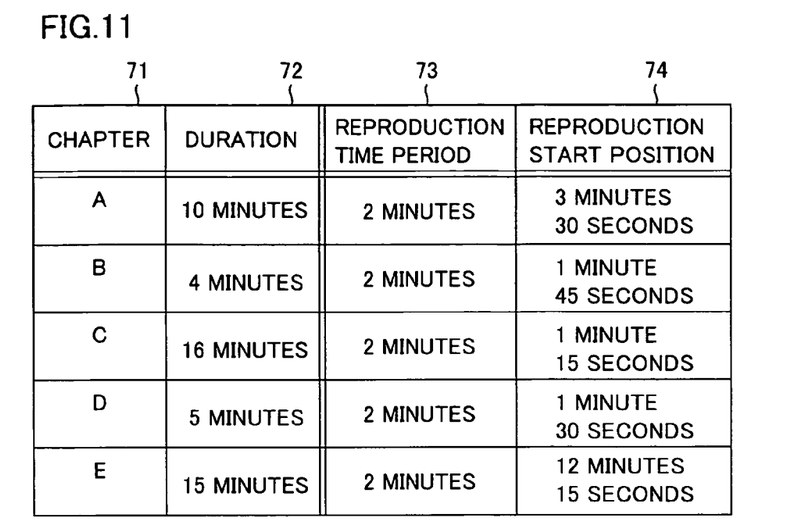
FIG. 11 illustrates a memory area according to the second embodiment of the present invention.

FIG. 11 illustrates the storage area in memory 112 after the processing at step S24 described above.

Referring to FIG. 11, an area 71 and an area 72 are similar to area 31 and area 32 in FIG. 7, respectively, shown in connection with the variation of the first embodiment. An area 73 stores reproduction time period "t" calculated at step S22, and an area 74 stores each reproduction start position determined at step S23.

As to the reproduction start position of each chapter randomly determined at step S23 described above, the reproduction start positions of chapters A to E are assumed as positions at 3 minutes 30 seconds, 1 minute 45 seconds, 1 minute 15 seconds, 1 minute 30 seconds, and 12 minutes 15 seconds from the beginning of the chapters, respectively. Such data is stored in area 74.

Figure 12:
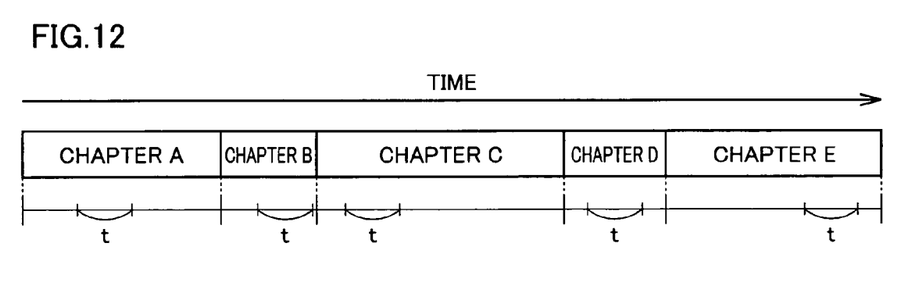
FIG. 12 is a timing chart in digest reproduction according to the second embodiment.

FIG. 12 is a timing chart when digest reproduction at step S26 described above is performed in accordance with the reproduction start position determined in the above-described manner.

Referring to FIG. 12, system control circuit 110A reads the reproduction start position of chapter A from area 74 of memory 112, and reads video data by a period of 2 minutes from that position on DVD 172 (a position distant from the beginning of chapter A by 3 minutes 30 seconds, for example). Then, reading proceeds to chapter B, and video data is read by a period of 2 minutes from the position distant from the beginning of chapter B by 1 minute 45 seconds, for example. Reproduction is thus performed until last chapter E.

As described above, in the second embodiment, the reproduction start position of each chapter is randomly determined. Therefore, even if the user views the same DVD, he/she can view different video image each time, and further enjoy digest reproduction.

In the second embodiment, as in the variation of the first embodiment, reproduction time period "t" for each chapter calculated at step S22 may be derived based on the ratio of duration of each chapter.

Third Embodiment

A third embodiment of the disc reproduction apparatus according to the present invention will now be described.

A configuration of the disc reproduction apparatus and a function thereof in the third embodiment are similar to those in the second embodiment described above. Therefore, the third embodiment will be described by again using reference numerals for DVD recorder 100 and system control circuit 110A shown in FIGS. 1 and 9.

DVD recorder 100 in the third embodiment has a mode in which digest reproduction is started from the beginning of each chapter (hereinafter, referred to as "defined mode") and a mode in which digest reproduction is started from a random position in each chapter (hereinafter, referred to as "random mode"). The user can select either mode.

Figure 13:
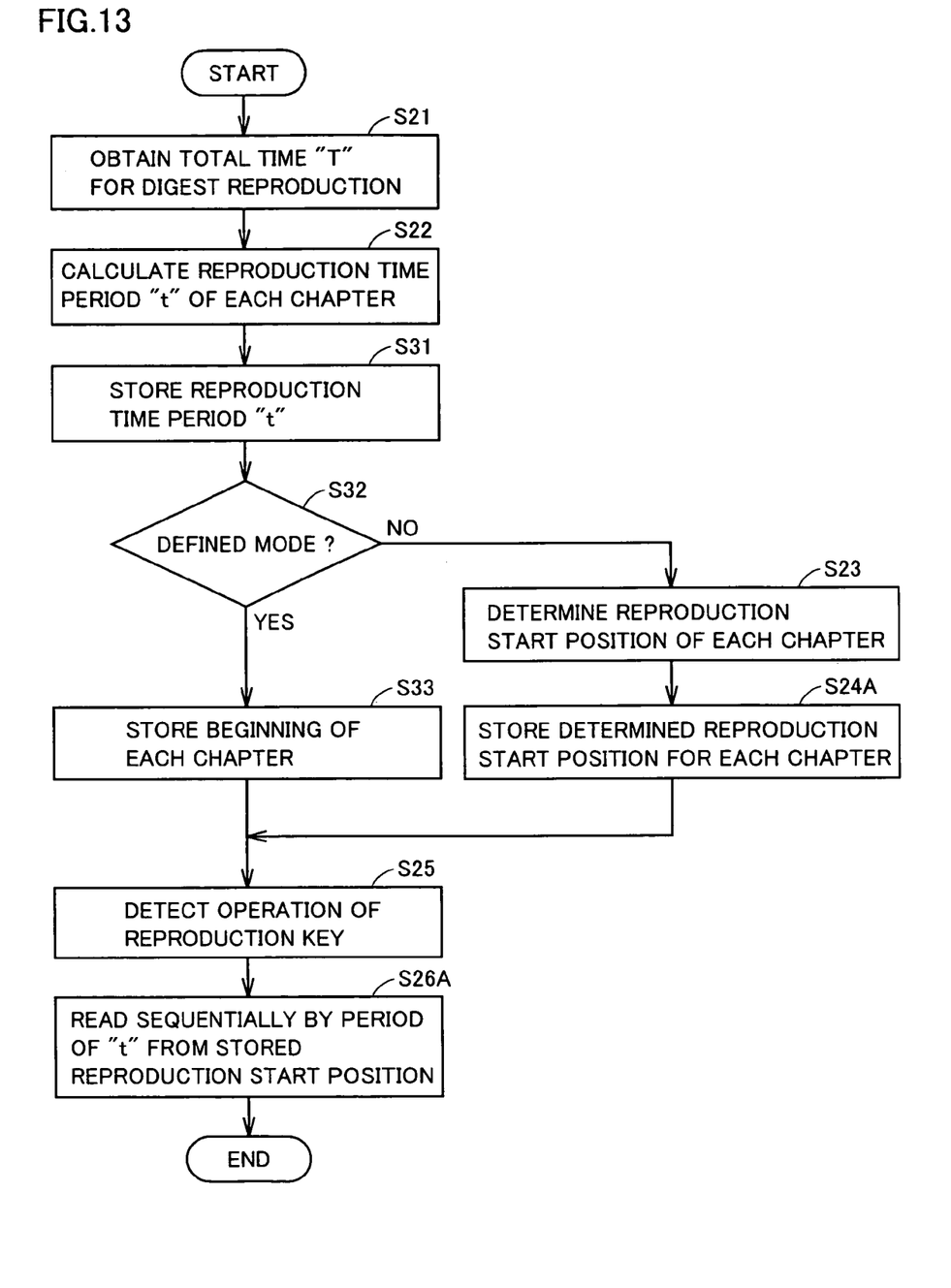
FIG. 13 is a flowchart showing processing for digest reproduction according to the second embodiment of the present invention.

FIG. 13 is a flowchart showing processing for digest reproduction according to the third embodiment. As the same step number is given to processing in FIG. 13 similar to that in the flowchart shown in FIG. 10, description thereof will not be repeated.

Referring to FIG. 13, system control circuit 110A performs the processing at steps S21 and S22 described above. Then, reproduction time period "t" of each chapter calculated at step S22 is stored in the storage area within memory 112 (step S31).

In succession, system control circuit 110A determines whether or not the defined mode has been selected (step S32). Selection of the mode by the user is made, for example, simultaneously with input of total time "T" for digest reproduction after selection of digest reproduction.

Figure 14:
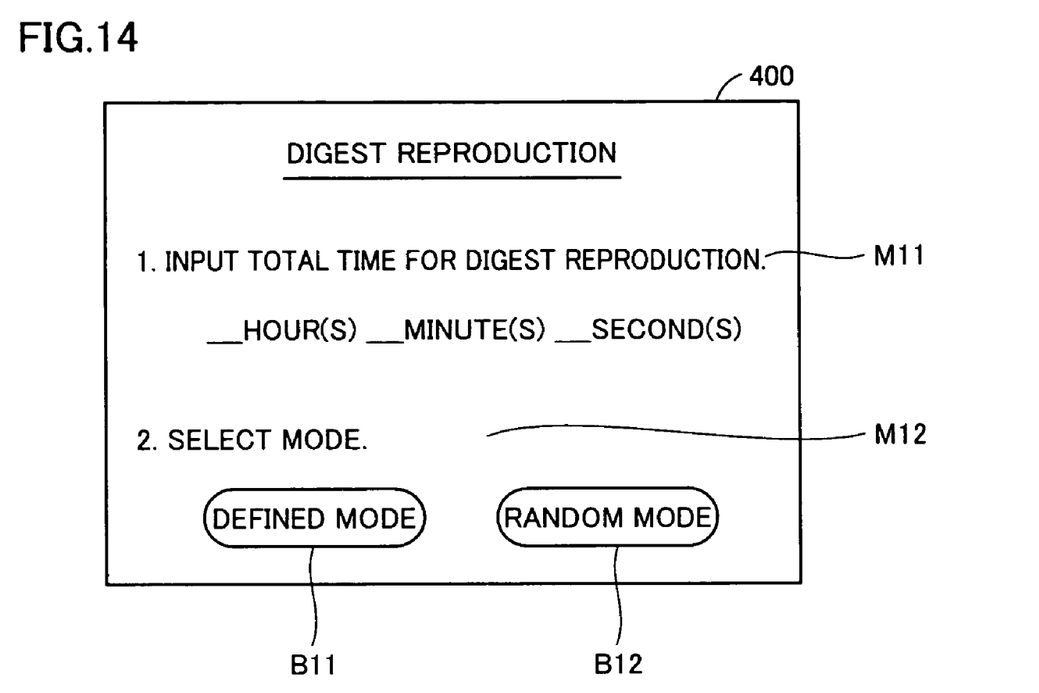
FIG. 14 shows one display example on a screen after digest reproduction is selected.

FIG. 14 shows one display example on a screen shown after the user selects digest reproduction. Referring to FIG. 14, for example, television 400 shows a message M11 saying that "Input the total time for digest reproduction." Under message M11, a field for accepting an input of the total time for digest reproduction is displayed, so that the user can input the total time for digest reproduction by operating a cursor of a not-shown remote controller or the like. In addition, a message M12, for example, saying that "Select mode" is displayed, under which a button B11 for selecting the defined mode and a button B12 for selecting the random mode are shown. The user selects either button by operating the cursor of a not-shown remote controller or the like, so as to select the mode for digest reproduction.

Referring again to FIG. 13, if it is determined at step S32 that the defined mode has been selected (YES at step S32), the beginning of each chapter is stored in the storage area within memory 112 as the reproduction start position for each chapter (step S33).

On the other hand, if it is determined at step S32 that the defined mode has not been selected, that is, the random mode has been selected (NO at step S32), the processing at step S23 described above is performed. Then, the reproduction start position for each chapter determined at step S23 is stored in the storage area within memory 112 for each chapter (step S24A).

After completion of the processing at step S33 or step S24 described above, whether or not the reproduction key has been operated is detected (step S25).

When the operation of the reproduction key is detected at step S25, reproduction time period "t" and the reproduction start position for each chapter stored in memory 112 are read. Then, video data from the reproduction start position of each chapter is sequentially read by a period of "t" from DVD 172 mounted on DVD drive 170, and the video image is output to television 400 (step S26).

Figure 15A:
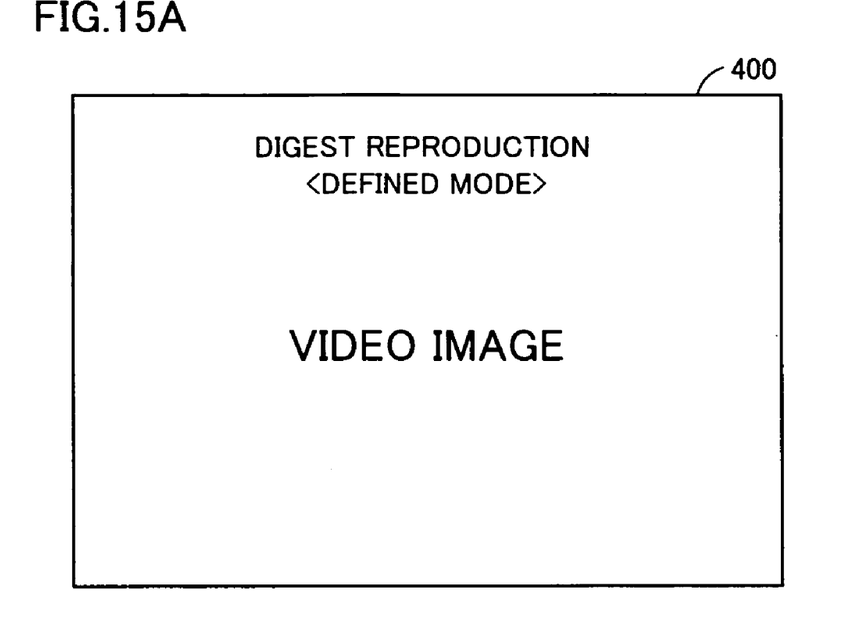
FIG. 15A shows a display example on the screen when digest reproduction is performed in a defined mode.
Figure 15B:
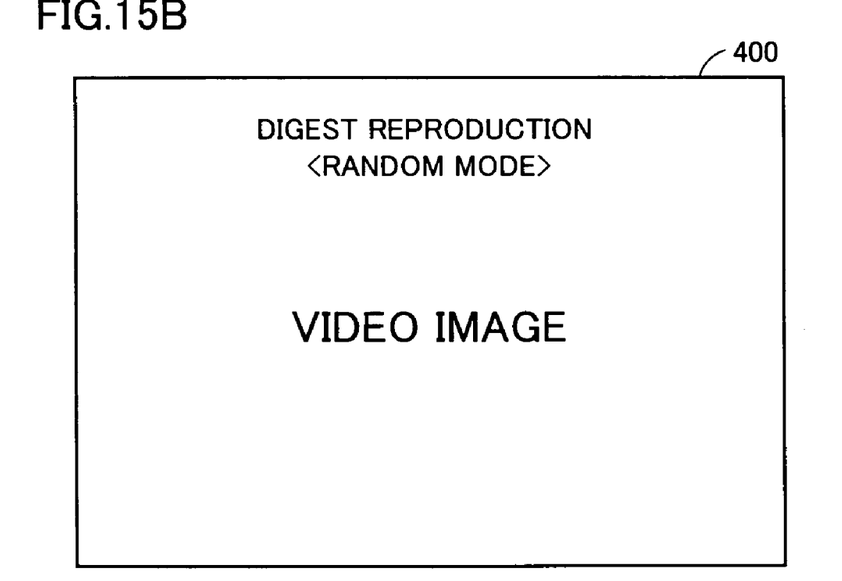
FIG. 15B shows a display example on the screen when digest reproduction is performed in a random mode.

While digest reproduction is being performed at step S26, which mode is selected may be displayed on television 400. FIGS. 15A and 15B show display examples on a screen in such a case. FIG. 15A shows a display example on the screen when digest reproduction is performed in the defined mode, while FIG. 15B shows a display example on the screen when digest reproduction is performed in the random mode. In FIG. 15A, for example, "digest reproduction <defined mode>" is shown in an upper portion of the screen of television 400. In FIG. 15B, for example, "digest reproduction <random mode>" is shown in the upper portion of the screen of television 400. In this manner, the mode is shown during digest reproduction, so that the user can easily know what kind of reproduction is being carried out.

As described above, in the third embodiment, when the defined mode is selected, reproduction by a period of "t" from the beginning of each chapter is performed. Meanwhile, when the random mode is selected, reproduction by a period of "t" from the reproduction start position randomly determined for each chapter is performed. In this manner, for example, the user can select the mode depending on the contents in DVD 172, and further enjoy digest reproduction.

It is noted that, though the DVD recorder has been described by way of example as the disc reproduction apparatus in the first to third embodiments discussed above, the disc reproduction apparatus is not limited thereto and any apparatus capable of reproduction of a disc-like recording medium may be employed.

In addition, the method of calculating reproduction time period "t" for each chapter performed by the disc reproduction apparatus according to the present invention may be provided as a program. Such a program may be recorded on an optical medium such as a CD-ROM (Compact Disc-ROM) and a computer-readable recording medium such as a memory card, so as to be provided as a program product. Moreover, the program may be downloaded through a network.

The provided program product is installed in a program storage unit such as memory 112 and executed. The program product includes a program itself and a recording medium on which the program is recorded.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A disc reproduction apparatus, comprising:
    a reproduction unit for reading and reproducing data containing a plurality of chapters recorded on a disc-like recording medium;
    an input unit for accepting an input of an instruction from a user; and
    a control unit for controlling a reproduction operation by said reproduction unit in accordance with said instruction accepted through said input unit; wherein
    said control unit includes
    a read portion for reading information on said plurality of chapters recorded on said recording medium when information designating a first reproduction time period is accepted through said input unit,
    a time calculation portion for calculating second reproduction time periods respectively corresponding to said chapters, based on information on said plurality of chapters read by said read portion and said designated first reproduction time period, and
    a chapter control portion for reading and reproducing at least part of said chapter recorded on said recording medium, in accordance with said second reproduction time periods calculated by said time calculation portion.

2. The disc reproduction apparatus according to claim 1, wherein
    said time calculation portion calculates said second reproduction time periods by dividing said first reproduction time period by number of said chapters read by said read portion.

3. The disc reproduction apparatus according to claim 1, wherein
said time calculation portion calculates said second reproduction time periods by proportionally allocating said first reproduction time period based on a duration of each said chapter.

4. The disc reproduction apparatus according to claim 1, wherein
said chapter control portion reads and reproduces at least said part of each said chapter from chapter beginning point.

5. The disc reproduction apparatus according to claim 1, wherein
said control unit further includes a determination portion for randomly determining a reproduction start position of each said chapter, and
said chapter control portion reads and reproduces at least said part of each said chapter from said reproduction start position determined by said determination portion.

6. The disc reproduction apparatus according to claim 5, wherein
said determination portion determines the reproduction start position of each said chapter by using a random number table stored in advance.

7. The disc reproduction apparatus according to claim 1, further comprising:
a selection unit for allowing a user to choose whether the reproduction start position of each said chapter should be beginning of each chapter or a random position in each said chapter; and
a storage unit for storing the reproduction start position of each said chapter in accordance with a result of choice through said selection unit; wherein
said chapter control portion reads and reproduces at least said part of each said chapter from said reproduction start position stored in said storage unit.

8. The disc reproduction apparatus according to claim 7, wherein
said control unit further includes a determination portion for randomly determining the reproduction start position of each said chapter when choice indicating reproduction from a random position is made through said selection unit, and
said storage unit stores, for each said chapter, said reproduction start position determined by said determination portion.

9. The disc reproduction apparatus according to claim 7, wherein
said storage unit stores the beginning of each said chapter when choice indicating reproduction from the beginning of each chapter is made through said selection unit.

10. A disc reproduction apparatus, comprising:
a reproduction unit for reading and reproducing data containing a plurality of chapters recorded on a disc-like recording medium;
an input unit for accepting an input of an instruction from a user; and
a control unit for controlling a reproduction operation by said reproduction unit in accordance with said instruction accepted through said input unit; wherein
said control unit includes
a read portion for reading information on said plurality of chapters recorded on said recording medium when information designating a first reproduction time period is accepted through said input unit, and
a time calculation portion for calculating second reproduction time periods respectively corresponding to said chapters based on information on said plurality of chapters read by said read portion and said designated first reproduction time period,
said time calculation portion has
a first calculation portion for calculating said second reproduction time periods by dividing said first reproduction time period by number of said chapters read by said read portion, and
a second calculation portion for calculating said second reproduction time periods by proportionally allocating said first reproduction time period based on a duration of each said chapter,
said control unit further includes
a determination portion for randomly determining a reproduction start position of each said chapter, and
a chapter control portion for reading and reproducing at least part of said chapter recorded on said recording medium in accordance with said second reproduction time periods calculated by said time calculation portion, and
said chapter control portion has
a first start portion reading and reproducing at least said part of each said chapter from chapter beginning point, and
a second start portion reading and reproducing at least said part of each said chapter from said reproduction start position determined by said determination portion.

* * * * *